(12) United States Patent
Breddermann et al.

(10) Patent No.: US 12,379,464 B2
(45) Date of Patent: Aug. 5, 2025

(54) METHOD FOR ADJUSTING CORRECTION INFORMATION IN A RADAR SYSTEM

(71) Applicant: HELLA GmbH & Co. KGaA, Lippstadt (DE)

(72) Inventors: Tobias Breddermann, Lippstadt (DE); Tai Fei, Hamm (DE); Adrian Macaveiu, Jud. Timis (RO); Christian Westhues, Hamm (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 486 days.

(21) Appl. No.: 17/866,200

(22) Filed: Jul. 15, 2022

(65) Prior Publication Data

US 2022/0349995 A1 Nov. 3, 2022

Related U.S. Application Data

(63) Continuation of application No. PCT/EP2021/050763, filed on Jan. 15, 2021.

(30) Foreign Application Priority Data

Jan. 17, 2020 (DE) .................... 10 2020 101 012.5

(51) Int. Cl.
*G01S 7/40* (2006.01)
*G01S 13/93* (2020.01)
*G01S 13/931* (2020.01)

(52) U.S. Cl.
CPC .......... *G01S 7/4091* (2021.05); *G01S 13/931* (2013.01)

(58) Field of Classification Search
CPC .............................. G01S 7/4091; G01S 13/931
See application file for complete search history.

(56) References Cited

U.S. PATENT DOCUMENTS

| 7,151,479 B2 | 12/2006 | Beez et al. |
| 7,304,602 B2 | 12/2007 | Shinagawa et al. |

(Continued)

FOREIGN PATENT DOCUMENTS

| DE | 10207437 A1 | 9/2003 |
| DE | 602005000618 T2 | 6/2007 |

(Continued)

OTHER PUBLICATIONS

International Search Report dated Apr. 28, 2021 in corresponding application PCT/EP2021/050763.

*Primary Examiner* — William Kelleher
*Assistant Examiner* — Helena H Seraydaryan
(74) *Attorney, Agent, or Firm* — Muncy, Geissler, Olds & Lowe, P.C.

(57) ABSTRACT

A method for automatically adjusting correction information in a radar system of a vehicle. The method includes: performing at least one acquisition of at least one item of acquisition information by a radar sensor, the acquisition information being specific to at least one item of angle information and one item of distance information relating to at least one detected object in an environment of the vehicle. An identification of a reference object is performed in the environment on the basis of the acquisition information. An ascertainment of the distance information relating to the reference object is performed on the basis of the acquisition information. The adjustment of the correction information is performed on the basis of the ascertained distance information relating to the reference object in order to provide a correction of the angle information.

14 Claims, 5 Drawing Sheets

(56) References Cited

U.S. PATENT DOCUMENTS 10,126,410 B2 11/2018 Treptow et al.
2005/0116854 A1* 6/2005 Beez .................... H01Q 19/062
342/107

FOREIGN PATENT DOCUMENTS

DE 102006045165 A1 * 4/2008
DE 102013209530 A1 11/2014

* cited by examiner

METHOD FOR ADJUSTING CORRECTION INFORMATION IN A RADAR SYSTEM

This nonprovisional application is a continuation of International Application No. PCT/EP2021/050763, which was filed on Jan. 15, 2021, and which claims priority to German Patent Application No. 10 2020 101 012.5, which was filed in Germany on Jan. 17, 2020, and which are both herein incorporated by reference.

BACKGROUND OF THE INVENTION

Field of the Invention

The present invention relates to a method for adjusting correction information in a radar system. In addition, the invention relates to a radar system for carrying out the method.

Description of the Background Art

It is known from the prior art that a radar sensor can be used in vehicles for detection of objects in an environment of the vehicle. In this way, a distance and also, if applicable, a speed of the objects can be acquired. It is furthermore known that a direction of the objects can also be acquired through angle information in this case. For accurate determination of the direction, it is necessary for the alignment of the radar sensor on the vehicle to be known. Of course, the alignment can deviate from a predefined alignment owing to tolerances or errors during mounting and/or also owing to aging or changes on the vehicle. This can adversely affect the reliability of the direction determination.

SUMMARY OF THE INVENTION

It is therefore an object of the present invention to at least partially overcome the above-described disadvantages. In particular, it is an object of the present invention to provide improved object detection in a radar system of a vehicle.

The above object is attained by a method and by a radar system according to the invention. Of course, features and details that are described in connection with the method according to the invention also apply in connection with the radar system according to the invention and vice versa, so mutual reference is or can always be made with regard to the disclosure of the individual aspects of the invention.

The object is attained, for example, by a method for automatically adjusting correction information in a radar system of a vehicle. The vehicle is implemented, for example, as a motor vehicle, in particular a passenger car and/or truck. For example, the vehicle is implemented as an electric vehicle or hybrid vehicle or autonomous vehicle. The radar system can optionally be used in this case to provide an assistance function or autonomous driving function of the vehicle.

In a method according to the invention, the following steps, for example, are performed preferably sequentially and/or repeatedly, wherein each repetition preferably corresponds to one acquisition cycle: performing at least one acquisition of at least one item of acquisition information by a radar sensor of the radar system, wherein the acquisition information is specific to at least one item of angle information and one item of distance information relating to at least one detected object in an environment of the vehicle; performing an identification of a reference object (in particular from the detected objects) in the environment on the basis of the acquisition information; performing an ascertainment of the distance information relating to the reference object, in particular a distance of the radar sensor from the reference object, on the basis of the acquisition information; and/or performing the adjustment of the correction information on the basis of the ascertained distance information relating to the reference object in order to provide a correction of the angle information (in particular for additional objects of those detected).

This has the advantage that the correction information can be very accurately and reliably adjusted initially and/or continuously on the basis of the distance information relating to a distance to the reference object and, in particular, autonomously by the radar system, which is to say without manual interventions. The correction of the angle information can be carried out here in terms of a compensation of a deviation of the mounting angle (installation angle) from a specified ideal mounting angle of the radar sensor. A distance relationship to the reference object can be used for this purpose.

Provision can optionally be made that the correction information is implemented as information relating to an alignment of the radar sensor on the vehicle, in particular relating to a mounting angle of the radar sensor, preferably of an elevation of the alignment in a state mounted on the vehicle and/or of a mounting position error. The correction information can be designed to perform a correction of the angle information in order to determine a direction of at least one of the detected objects in relation to the radar sensor on the basis of the angle information. It is advantageous for this purpose to know the alignment of the radar sensor as accurately as possible. Accordingly, the correction information can be interpreted as information relating to the alignment of the radar sensor. However, this is not specified manually, for example through a measurement on the vehicle, but instead automatically and autonomously by the radar system. As a result, the correction information can be kept current, even when there are changes in the alignment.

Provision can be made that the adjustment of the correction information is accomplished through the following steps: providing the correction information from at least one prior adjustment (if it is present, in particular, wherein otherwise an initial value of the correction information can be used); performing a determination of a current correction angle on the basis of the ascertained distance information relating to the reference object, preferably through a calculation on the basis of an already-known height of the reference object and/or on the basis of a mounting height of the radar sensor on the vehicle and/or on the basis of a measured distance from the reference object to the radar sensor from the distance information; and/or adapting the correction information to the current correction angle, wherein preferably the current correction angle is taken into account in a weighted manner for the correction information.

This has the advantage that a reference for the angle information is provided on the basis of the correction information or the correction angle, and can be continuously updated, which is to say matched to the current conditions.

Provision can be made within the scope of the invention that the (provided) correction of the angle information for the current and/or at least one subsequent acquisition of the acquisition information is performed through the following steps: ascertaining the angle information through the at least one detected object on the basis of the acquisition information; and/or comparing the angle information with the correction information.

The correction can be provided, e.g., by the means that the correction information was adjusted on the basis of a correction angle. For this purpose, the correction information advantageously includes a value that represents the correction angle and can be included numerically in the calculation of a direction of a detected object on the basis of the angle information. The comparing can thus be understood to mean this arithmetic inclusion, for instance through addition. In this way, a correction of the angle information can reliably take place.

It can additionally be possible that the steps are performed repeatedly during an operation of the radar system, in particular in order to perform the adjustment of the correction information repeatedly and automatically and/or autonomously by the radar system, so that preferably the correction information is updated at every repetition, in particular on the basis of the current correction angle. Consequently, the adjustment of the correction information can be performed repeatedly and automatically during operation of the radar system in order to adjust the correction information on the basis of a distance relationship to the reference object. By means of the continuous updating, the advantage can be achieved that even a change in the mounting position of the radar sensor, for example owing to aging or a change on the vehicle, is taken into consideration. To this end, the adjustment or the updating can take place in every acquisition cycle, for example. The adjustment thus corresponds to an "auto-alignment" in the sense of continuous self-calibration of the radar system.

Moreover, it is advantageous when the adjustment of the correction information is performed for every acquisition of the acquisition information. Consequently, the adjustment of the correction information can take place in every acquisition cycle.

In addition, it is possible that the reference object is implemented in the manner of a ground reflection. In order to identify a detected object as ground reflection, a classification can be performed in the manner that the direction of the object is analyzed. For example, the ground reflection can be identified on the basis of the elevation angle to the object when the angle information indicates, e.g., an elevation angle less than 0. The use of the ground reflection can be advantageous because it offers a very accurate reference that can be determined in many situations.

It is advantageous, furthermore, when the identification is accomplished by the means that the reference object is chosen from the detected objects as such an object that is acquired as a stationary target and/or only during travel of the vehicle and/or under the vehicle. In this way, a classification can occur according to which a ground is chosen as reference object. The ground is the roadway on which the vehicle is standing, for example.

Moreover, it is possible within the scope of the invention that, during the adjustment, the correction information is formed as a correction value that preferably is specific to a correction angle and, in particular, corresponds thereto, wherein preferably the correction angle can be added to the angle information for the purpose of correction for the acquisition and especially preferably for every acquisition. As a result, a simple compensation of a deviation in the alignment of the radar sensor is possible in that the angle information is always placed in relationship to the reference object.

Preferably, it can be provided within the scope of the invention that the reference object is implemented in the manner of a detected object with an essentially constant object height, in particular a structure at the side of the roadway, preferably a guardrail or the like. The constant object height—such as offered by, for example, the guardrail—has the advantage that this height can serve as a reference for improving the angle information.

In addition, it is optionally possible within the scope of the invention that the identification is accomplished by the means that the reference object is chosen from the detected objects as such an object that is acquired as a stationary target and/or at a predetermined minimum speed of the vehicle and/or at localization of the vehicle on a predetermined route, in particular highway, and/or with a high signal-to-noise ratio and/or at a position to the side of the vehicle. The signal-to-noise ratio can be different for different detected objects, wherein a threshold value is used, if applicable, in order to choose the object with the specific signal-to-noise ratio for the reference object. The minimum speed can be specific to a speed on the highway. For example, the minimum speed can be a speed of at least 20 km/h or at least 40 km/h or at least 60 km/h or at least 100 km/h or at least 120 km/h. Furthermore, the reference object can be such an object for which the elevation angle (which is to say the direction of the object) is greater than 0, and thus above the vehicle.

Moreover, it is advantageous when the following step is performed during performance of the ascertainment: ascertaining the distance information in the manner of a height curve of a (measured) object height of the reference object over a distance (in particular increasing distance) (of the radar sensor) to the reference object, preferably through a calculation of an approximation such as a linear regression of the curve of the values of the acquisition information specific to the distance to the reference object; and/or the following steps are performed for the adjustment of the correction information: determining a parameter specific to an angular deviation, in particular a slope of the height curve; determining a correction angle on the basis of the parameter; and/or adjusting the correction information on the basis of the correction angle.

The angular deviation is, for example, a deviation in the alignment of the radar sensor from an ideal (horizontal) alignment. Such a deviation has the result that the measured object height increases differently from the actual constant object height of the reference object over the increasing distance from the radar sensor to the reference object. This slope can therefore be used to quantify the angular deviation and therefore to define the correction information.

In another option, provision can be made that the adjustment of the correction information is accomplished through a comparison of the ascertained distance information and an already-known mounting height of the radar sensor on the vehicle. To this end, a calculation of the correction angle on the basis of the already-known mounting height and the distance between radar sensor and reference object can be performed, for example.

The subject of the invention is likewise a radar system, for example a continuous wave radar system, in particular FMCW radar system, for a vehicle, preferably for detection of objects in an environment of the vehicle, having an acquisitor for acquisition of at least one item of acquisition information by a radar sensor of the radar system. The acquisition information can be specific to at least one item of angle information and one item of distance information relating to at least one detected object in the environment of the vehicle. The radar system can be arranged on the rear part of the vehicle, in particular in order to detect the objects in a back region of the vehicle as the environment of the vehicle.

The angle information can be information relating to a direction to the object and the distance information can be information relating to a distance to the object, ascertained by a processing such as a frequency analysis of the acquisition information, for example.

Provision can be made that the radar system further includes: an identificator for identification of a reference object in the environment on the basis of the acquisition information, an ascertainer for ascertainment of the distance information relating to the reference object, in particular relating to a distance to the reference object, on the basis of the acquisition information, an adjuster for adjustment of correction information on the basis of the ascertained distance information relating to the reference object in order to provide a correction of the angle information.

As a result, the radar system according to the invention provides the same advantages as have been described in detail with respect to a method according to the invention. Moreover, the radar system can be suitable for carrying out the method according to the invention. Thus, the radar system can include a processing device, in particular with a computer program, wherein the processing device includes the acquisitor and/or the identifier and/or the ascertainer and/or the adjuster, in order to carry out the steps of a method according to the invention.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
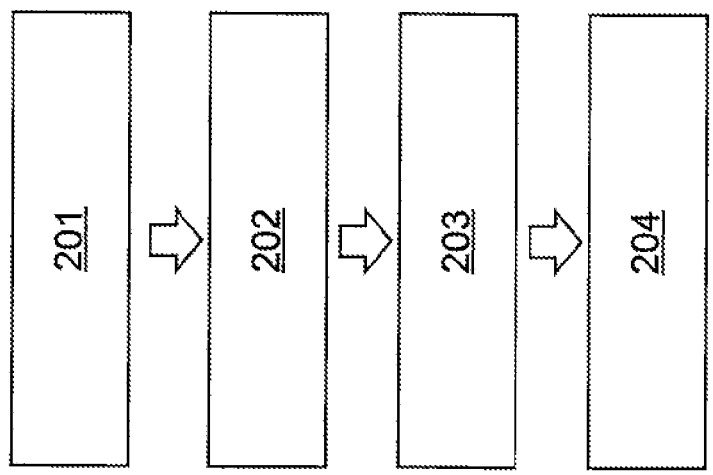
FIG. 1 is a schematic representation for visualizing a method according to the invention.

In FIG. 1, the steps of a method according to the invention are visualized schematically. The method here serves the automatic adjustment 204 of correction information 115 in a radar system 5 of a vehicle 1. According to a first method step 201, an acquisition of at least one item of acquisition information 100 is accomplished by a radar sensor 6 of the radar system 5. In this case the acquisition information 100 can be specific to at least one item of angle information 106 and one item of distance information 105 relating to at least one detected object 2 in an environment 50 of the vehicle. In other words, the distance information 105 relating to a distance to the detected object 2 and the angle information 106 relating to an angle (i.e., a direction) of the object 2 relative to the radar sensor 6 can be ascertained from the acquisition information 100 using methods that are known per se for such radar systems. The angle can correspond, in particular, to the angle of incidence on the radar sensor 6 of the radar signals reflected by the object 2. It is likewise known that a speed of the object 2 relative to the radar sensor 6 can be ascertained from the acquisition information 100.

In the radar system 5 according to the invention, the acquisition 201 can be possible by the means that the radar system 5 and, in particular, the radar sensor 6 emits a radar signal that is reflected by the at least one object 2 and can then be received by the radar sensor 6. For this purpose, the radar sensor 6 can have multiple antennas that each receive the radar signal. In this way, the angle information 106 can be determined reliably on the basis of a time-of-flight or phase difference of the received radar signals (among one another). The radar system can be implemented, by way of example, as a continuous wave radar, in particular FMCW radar (frequency modulated continuous wave radar), so that the emitted radar signal can have a frequency-modulated signal form. In concrete terms, the emitted radar signal can be implemented as a chirp signal. The acquisition information 100 can be obtained by, e.g., down-conversion of the received radar signal to baseband and subsequent digitization, e.g. by an analog-to-digital converter. Additional or different processing steps are of course also encompassed by the invention.

Once the acquisition information 100 is on hand, according to a second method step 202 an identification of a reference object 3 in the environment 50 can subsequently be performed on the basis of the acquisition information 100. For example, the detected objects 2 with the associated distance, angle, and/or speed information can be ascertained through a processing of the acquisition information 100, such as at least one frequency transformation. For identification 202 of the reference object 3, provision can be made that the detected objects 2 are analyzed on the basis of predetermined criteria. For example, only those objects 2 whose angle information 106 indicates a negative angle, and thus are located under the vehicle 1, are taken into account. In this way, the reference object 3 is identified as a particular object 2, such as a ground level. It is possible here that other object types also come into consideration as reference object 3 provided that they have a defined property with regard to the object height and/or a distance characteristic to the radar sensor 6 and thus are suitable as a reference for the angle information 106.

Then, according to a third method step 203, an ascertainment 203 of the distance information 105 relating to the reference object 3 can be performed on the basis of the acquisition information 100. In other words, at least one distance that the reference object 3 has to the radar sensor 6 is ascertained. This can be a single distance value or different distance values in this case. The different distance values can be determined in the case of an extensive reference object 3 such as a guardrail, for example. It is also possible that the different distance values are ascertained over time during travel of the vehicle 1.

According to a fourth method step 204, a performance of the adjustment 204 of the correction information 115 is accomplished on the basis of the ascertained distance information 105 relating to the reference object 3 in order to provide a correction of the item(s) of angle information 106 (i.e., for the current and/or additional angle information). It is therefore possible to correct the angle information 106 of additional detected objects 2 on the basis of the correction information 115 and, in particular, on the basis of the distance information 105 relating to the reference object 3.

The correction can be necessary because the exact alignment of the radar sensor 6 on the vehicle 1 is not known after mounting of the radar sensor 6 on account of tolerances and the like. In other words, the mounting angle or—in more general terms—the mounting position is unknown. However, the mounting height of the radar sensor 6 on the vehicle 1 can be known. The correction information 115 can accordingly be implemented as information relating to a mounting angle of the radar sensor 6, in particular an elevation of an alignment in a state mounted on the vehicle 1 and/or of a mounting position error.

Figure 2:
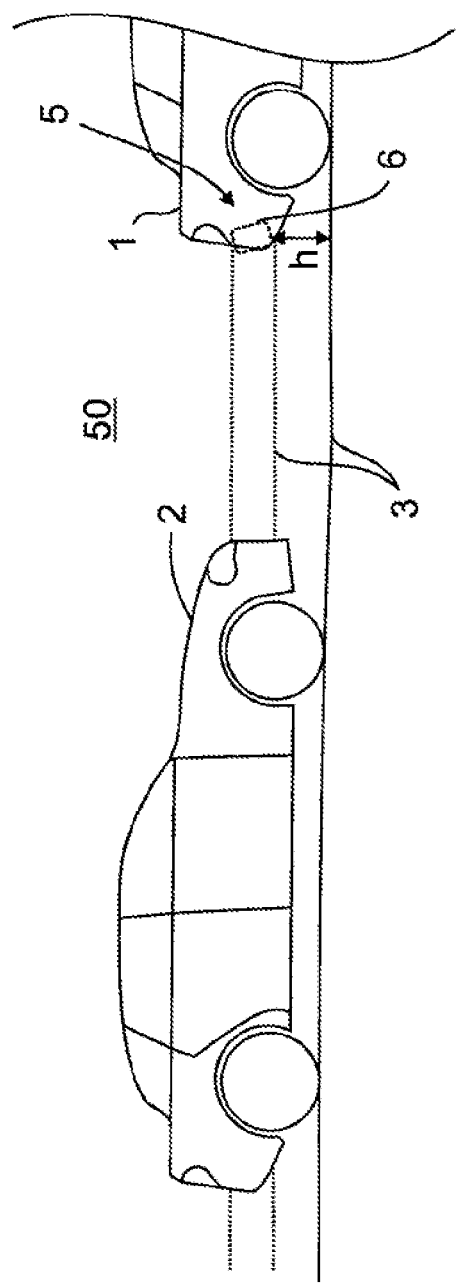
FIG. 2 is a schematic side view of a vehicle with a radar system according to the invention.
Figure 4:
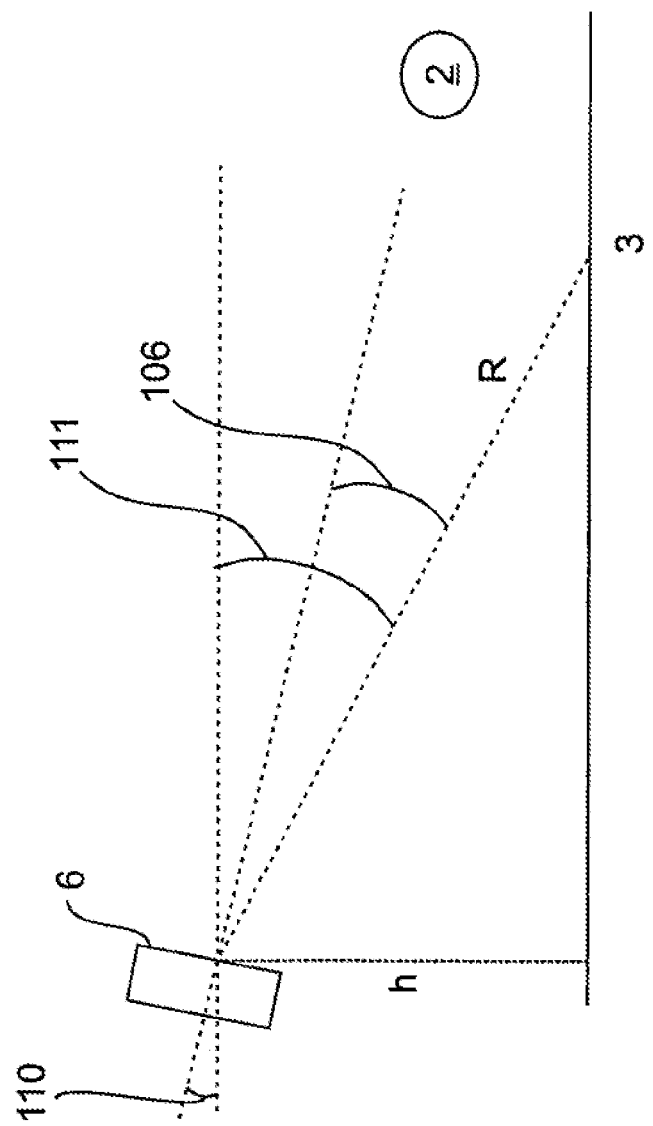
FIG. 4 is a representation for visualizing a correction angle.

In FIG. 2, this correlation is illustrated further. The radar sensor 6 here is mounted on the vehicle 1 at an already-known height h. A tilt of the radar sensor 6 can be seen, which is indicated in FIG. 4 with the angle 110, hereinafter called correction angle 110. Possible reference objects 3, such as a ground level at which the vehicle 1 is located, or a structure to the side on the shoulder of the road are also represented schematically.

Figure 3:
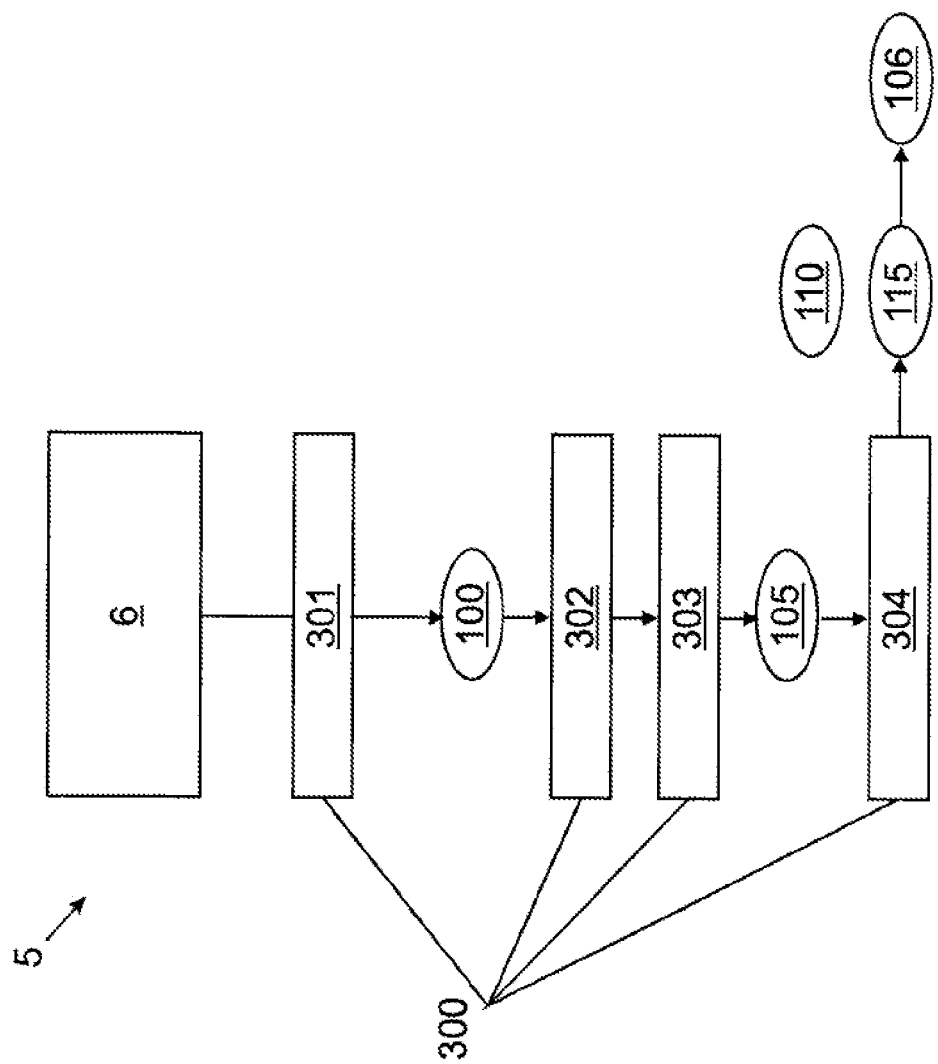
FIG. 3 is a schematic representation of parts of a radar system according to the invention.

Shown in FIG. 3 is that the method according to the invention can also be carried out by a processing device 300 such as a control unit of the vehicle 1. To this end, the processing device 300 can have an acquisitor 301 for performing the acquisition 201, an identifier 302 for performing the identification 202, an ascertainer 303 for performing the ascertainment 203, and an adjuster 304 for performing the adjustment 204. The various components 301-304 can be implemented as separate components or as one common component that is suitable for executing a computer program. Accordingly, the processing device 300 can be implemented as a data processing device such as a computer.

The adjustment 204 of the correction information 115 can be accomplished by the means that the previous correction information 115 from at least one prior adjustment is first provided. If there is no prior adjustment, then a predefined initial value can also be used, and/or the correction information 115 can be determined initially from the correction angle 110 described below. Then a performing of a determination of a current correction angle 110 can occur on the basis of the ascertained distance information 105 relating to the reference object 3. After that, an adapting of the correction information 115 to the current correction angle 110 occurs, wherein the current correction angle 110 can be taken into account in a weighted manner for the correction information 115. As a result, past values of the correction information 115 receive a higher weighting than current values so that an error tolerance can be increased.

According to FIG. 4 the correction of the angle information 106 for the acquisition 201 and/or at least one subsequent acquisition 201 of the acquisition information 100 can be accomplished by the steps that first an ascertaining of the angle information 106 relating to the at least one detected object 2 is performed on the basis of the acquisition information 100 in order to then compare this angle information 106 with the correction information 115. In concrete terms, the correction information 115 can be implemented here as a correction value that is specific to a correction angle 110 which is added to the angle information 106 for the purpose of correction for the acquisition 201. This is useful especially when the reference object 3 is implemented in the manner of a ground reflection—which is to say ground level 3. In this case, the following distance relationship can be utilized:

$$\sin(a) = h/R,$$

where h denotes the shortest distance between the radar sensor 6 and the ground level 3, which is to say the height, and R denotes the distance between the radar sensor 6 and the ground level 3 corresponding to the radar signals reflected by the ground level 3. The value for h can be known in advance and/or be measured after mounting of the radar sensor 6, and R can be ascertained from the distance information 105 relating to the detected reference object 3 on the basis of the acquisition information 100. The angle a here denotes the reference angle 111, which is to say, in particular, an angle of incidence of the reflected radar signals relative to a horizontal plane. The (current) correction angle 110 can be ascertained from this, for example as the difference between the calculated angle a and the angle information 106 relating to the reference object 3 that is ascertained from the acquisition information 100—which is to say measured. The correction angle 110 can then serve to perform the correction for additional detected objects 2 by an addition to the angle information 106. This correction is especially reliable owing to the use of the mathematically robust distance relationship. The more inaccurate speed relationship between the reference object 3 and the radar sensor 6 can indeed be used for classification of the reference object 3, which is to say for identification, but is not needed beyond that for the determination of the correction angle 110. As a result, the reliability can be further improved.

Figure 5:
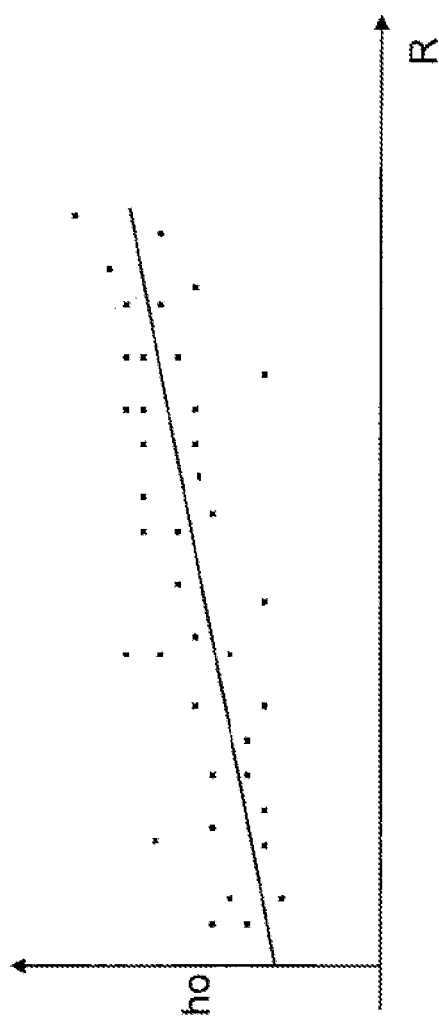
FIG. 5 is a representation to illustrate an adjustment in accordance with the method according to the invention.

In addition, the reference object 3 can optionally be implemented in the manner of a structure at the side of the roadway, in particular a guardrail or the like. According to FIG. 5, the distance information 105 can be ascertained in the manner of a height curve of the object height ho of the reference object 3 over an increasing distance R to the reference object 3 during performance of the ascertainment 203. The acquisition information 100 can be adversely affected by noise so that the measured height values of the object height ho are scattered accordingly (indicated by the points in FIG. 5). Provision can therefore be made that an approximation such as a linear regression is calculated from the height values in order to obtain the illustrated height curve with a constant slope. The ideal relationship between the object height ho of the reference object 3, the elevation angle b to the reference object 3 ascertained from the angle information 106, and the distance R to the reference object 3 ascertained from the distance information 105 is, e.g., the following here:

$$ho = h(\text{i.e., height of the sensor}) + R*\sin(b)$$

In the case of an ideal alignment of the radar sensor 6 at the horizontal, the object height ho of the reference object 3 would not change for different distances R to the reference object 3. It can be seen in FIG. 5, however, that the curve of the object height ho changes over the different distances R, and thus a slope is present that is not equal to 0. For very small elevation angles b, it is the case here that the slope corresponds approximately to the correction angle 110 (clearly visible in FIG. 4). The slope can thus be used to determine the correction angle 110 and thus also to adjust the correction information 115 for correction of the angle information 106 of additional objects 2.

The above explanation of the embodiments describes the present invention solely within the framework of examples. Individual features of the embodiments can of course be combined freely with one another, insofar as is technically appropriate, without departing from the scope of the present invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for automatically adjusting correction information in a radar system of a vehicle, the method comprising:
performing at least one acquisition of at least one item of acquisition information by a radar sensor of the radar system, wherein the acquisition information is specific to at least one item of angle information and one item of distance information relating to at least one detected object in an environment of the vehicle;
performing an identification of a reference object in the environment based on the acquisition information;
performing an ascertainment of the distance information relating to the reference object based on the acquisition information; and
performing the adjustment of the correction information based on the ascertained distance information relating to the reference object in order to provide a correction of the angle information,
wherein during performance of the ascertainment, the distance information is ascertained as a height curve of an object height of the reference object over a distance to the reference object, and
wherein, for the adjustment of the correction information, the method further comprises:
determining a parameter specific to an angular deviation or a slope of the height curve;
determining a correction angle based on the parameter; and
adjusting the correction information based on the correction angle.

2. The method according to claim 1, wherein the correction information is information relating to an alignment of the radar sensor on the vehicle or relating to a mounting angle of the radar sensor of an elevation of the alignment in a state mounted on the vehicle.

3. The method according to claim 1, wherein the adjustment of the correction information comprises:
providing the correction information from at least one prior adjustment;
performing a determination of a current correction angle based on the ascertained distance information relating to the reference object; and
adapting the correction information to the current correction angle,
wherein the current correction angle is taken into account in a weighted manner for the correction information.

4. The method according to claim 3, wherein the correction of the angle information for the current acquisition and/or at least one subsequent acquisition of the acquisition information comprises:
ascertaining the angle information through the at least one detected object based on the acquisition information; and
comparing the angle information with the correction information.

5. The method according to claim 1, wherein the steps are performed repeatedly during an operation of the radar system in order to perform the adjustment of the correction information repeatedly and automatically so that the correction information is updated at every repetition.

6. The method according to claim 5, wherein the adjustment of the correction information is performed for every acquisition of the acquisition information.

7. The method according to claim 1, wherein the reference object is identified from a ground reflection.

8. The method according to claim 7, wherein, during the identification, the reference object is chosen from the detected objects as an object that is acquired as a stationary target and/or only during travel of the vehicle and/or under the vehicle.

9. The method according to claim 1, wherein, during the adjustment, the correction information is formed as a correction value that is specific to a correction angle, which is added to the angle information for the purpose of correction for every acquisition.

10. The method according to claim 1, wherein the reference object is a detected object with an essentially constant object height or a structure at a side of a roadway or is a guardrail.

11. The method according to claim 1, wherein, during the identification, the reference object is chosen from the at least one detected object as an object that is acquired as a stationary target and/or at a predetermined minimum speed of the vehicle and/or at localization of the vehicle on a predetermined route or a highway, and/or with a high signal-to-noise ratio and/or at a position to the side of the vehicle.

12. The method according to claim 1, wherein the adjustment of the correction information is accomplished through a comparison of the ascertained distance information and an already-known mounting height of the radar sensor on the vehicle.

13. A radar system for a vehicle for detection of an object in an environment of the vehicle, the radar system comprising:
an acquisitor to acquire at least one item of acquisition information by a radar sensor of the radar system, wherein the acquisition information is specific to at least one item of angle information and one item of distance information relating to at least one detected object in the environment of the vehicle;
an identifier to identify a reference object in the environment based on the acquisition information;
an ascertainer to ascertain the distance information relating to the reference object based on the acquisition information; and
an adjuster to adjust correction information based on the ascertained distance information relating to the reference object in order to provide a correction of the angle information,
wherein the distance information is a height curve of an object height of the reference object over a distance to the reference object, and
wherein the adjuster adjusts the correction information by determining a parameter specific to an angular deviation or a slope of the height curve, determining a correction angle based on the parameter and adjusting the correction information based on the correction angle.

14. The radar system according to claim 13, wherein the radar system comprises a processing device, with a computer program, wherein the processing device comprises the acquisitor and/or the identifier and/or the ascertainer and/or the adjuster.

\* \* \* \* \*